UNITED STATES PATENT OFFICE.

FRANCIS J. HUBER, OF CLEVELAND, OHIO.

ARTIFICIAL STONE.

Specification forming part of Letters Patent No. 36,153, dated August 12, 1862.

*To all whom it may concern:*

Be it known that I, FRANCIS JOSEPH HUBER, of Cleveland, in the county of Cuyahoga and State of Ohio, have invented certain new and useful Improvements in Artificial Stone; and I do hereby declare that the following is a full, clear, and exact description of the manufacture and use of the same.

My invention consists in the manufacture of an artificial stone the chief components of which are lias lime, coal-ashes, and pulverized brick or earthenware, and in the modification of said artificial stone so as to increase its hardness by the addition of certain ingredients, hereinafter to be referred to.

To enable others skilled in the art to make and use my invention, I will proceed to describe its construction and operation.

The chief components of this artificial stone are lias lime, coal-ashes, and pulverized brick or fragments of earthenware. Coal-ashes and waste brick or pottery may be obtained in large quantities in large cities, where they can seldom be used to any advantage. It is therefore a cheap material, and which I use with great advantage in the manufacture of artificial stone, as I have found out by several years' experiments. The lias limestone is burned and slaked and reduced to a fine powder. The other materials are also to be used in a pulverized state, and they are mixed in the proportion of one part of lias lime, one part of coal-ashes, and one part of pulverized brick. These are thoroughly mixed, and are then moistened to make them sufficiently consistent. The material is then pressed into the shape of rectangular blocks by means of a powerful press, and the blocks are dried in the open air and become solid and hard in the course of a few days, and are an excellent material for building purposes. (Specimen No. 2.)

By adding to the above components one-half part of iron filing and one-sixteenth part of rye-flour a stone is obtained which is considerable harder, and may therefore be used in such places where the material is exposed to direct wear—such as stairs and floors—the rye-flour facilitating the chemical combination of the lias lime with the other ingredients. (Specimen 18.) All these ingredients are moistened with water, thoroughly mixed, and reduced to a plastic paste, which is then pressed into blocks, and the latter are dried, when they will harden without subjecting them to the laborious and costly operation of burning.

All the proportions of the several ingredients as specified in the above description are used by the weight or pound.

Having thus fully described the nature of my invention, what I claim herein as new, and desire to secure by Letters Patent, is—

An artificial stone composed of lias lime, coal-ashes, and pulverized bricks, when this composition is used with or without the additional ingredients, substantially in the manner and for the purpose herein described.

FRANCIS JO. HUBER.

Witnesses:
E. COHEN,
JULIUS H. BROWN.